United States Patent [19]

Kade et al.

[11] Patent Number: 4,540,923
[45] Date of Patent: Sep. 10, 1985

[54] ADAPTIVE SERVOMOTOR CONTROLLER

[75] Inventors: Alexander Kade, Detroit; Sam M. Karadsheh, Troy, both of Mich.

[73] Assignee: General Motors Corporation, Detroit, Mich.

[21] Appl. No.: 609,779

[22] Filed: May 14, 1984

[51] Int. Cl.³ .................. G05B 13/00; G05B 11/01
[52] U.S. Cl. ................................ 318/561; 318/631
[58] Field of Search ............ 318/561, 571, 631, 568; 364/474

[56] References Cited

U.S. PATENT DOCUMENTS

| | | | |
|---|---|---|---|
| 3,201,669 | 8/1965 | Hollmann | 318/631 X |
| 3,465,218 | 9/1969 | Younkin | 318/631 X |
| 3,576,976 | 5/1971 | Russo | 318/561 UX |
| 3,699,720 | 10/1972 | Lenning | 318/561 X |
| 3,746,955 | 7/1973 | Kobayashi | 318/561 |
| 3,914,678 | 10/1975 | Chynoweth et al. | 318/568 |
| 4,074,178 | 2/1978 | Bower | 318/631 |
| 4,078,195 | 3/1978 | Mathias et al. | 318/561 |
| 4,131,837 | 12/1978 | Whetham | 318/571 |
| 4,208,718 | 6/1980 | Chung | 364/474 |
| 4,214,191 | 7/1980 | Watanabe et al. | 318/561 |
| 4,214,300 | 7/1980 | Barlow et al. | 364/105 |
| 4,218,733 | 8/1980 | Maselli | 364/105 |
| 4,219,765 | 8/1980 | Morsing | 318/561 |
| 4,279,013 | 7/1981 | Cameron et al. | 318/561 X |
| 4,386,305 | 5/1983 | Kohzai et al. | 318/571 |
| 4,387,421 | 6/1983 | Zach et al. | 364/148 |
| 4,408,280 | 10/1983 | Bedini et al. | 364/474 |
| 4,409,531 | 10/1983 | Bjurstrom | 318/631 |
| 4,500,823 | 2/1985 | Walrath | 318/561 |

Primary Examiner—B. Dobeck
Attorney, Agent, or Firm—Mark A. Navarre

[57] ABSTRACT

The gain of a servomotor driven process control system is adaptively compensated for changes in the motor coulomb friction torque. The gain is manually adjusted at the time of installation. Thereafter, the minimum motor current occurring in a process cycle is identified, and the gain is automatically adjusted if the identified minimum motor current changes over time, indicating a change in the motor coulomb friction torque. As a result, the level of response stability achieved at the time of installation is maintained despite changes in the motor coulomb friction torque.

4 Claims, 6 Drawing Figures

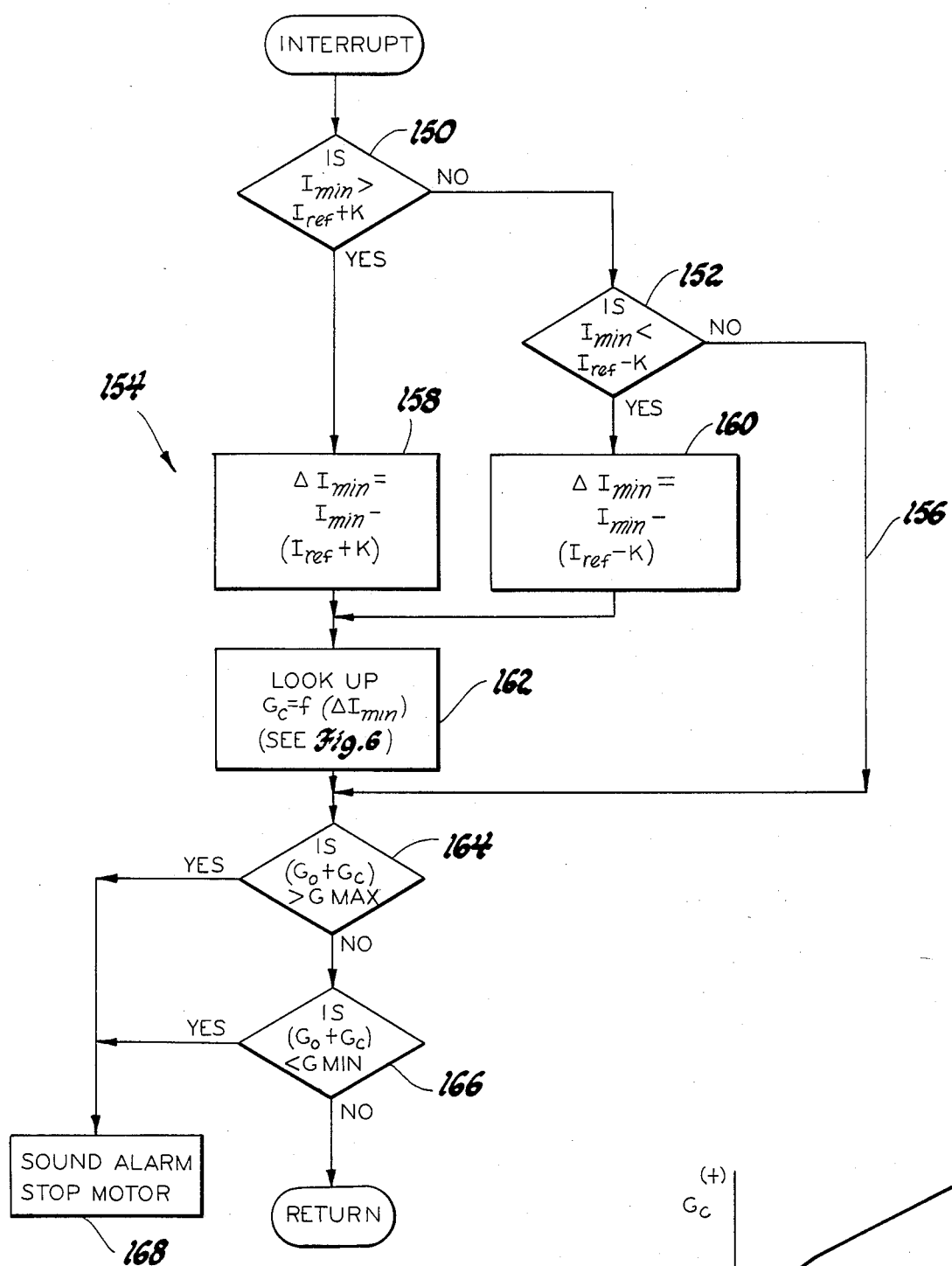
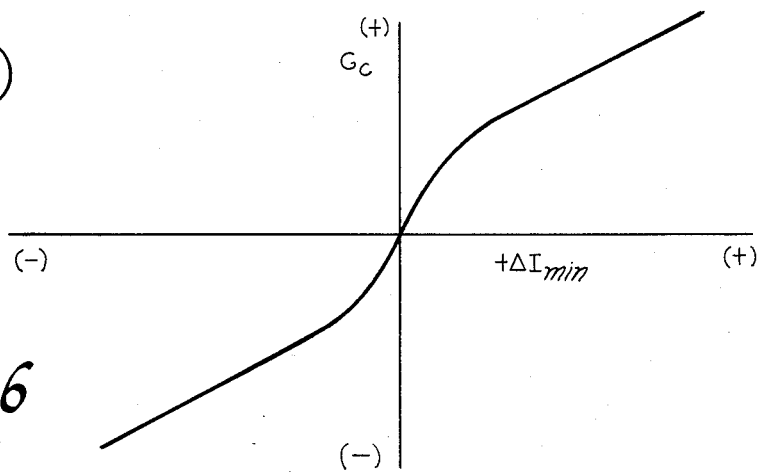
Fig.5
Fig.6

ADAPTIVE SERVOMOTOR CONTROLLER

This invention relates to servomotor driven process control systems and more particularly to a servomotor control which makes automatic gain adjustments to compensate for changes in the motor coulomb friction.

BACKGROUND OF THE INVENTION

Electric servomotors are used extensively in numerically controlled (NC) machines, robots, and other industrial equipment. Any given industrial process consists of a repetitious sequence of steps such as advancing or rotating a tool or other load mechanism. To automate the process with an NC machine or the like, a servomotor is connected to drive the tool or load mechanism and the individual process steps are characterized in terms of the motor operation (velocity or position) required to perform the steps. A computer or machine code corresponding to the required motor operation is determined and stored in a step sequencer which is effective to repetitively issue a series of servomotor commands in the correct sequence. A motor controller is responsive to the commands issued by the step sequencer and is operative to energize the servomotor with current from an electrical source in a manner to bring the particular motor operating parameter (velocity or position) into correspondence with the command for performing the process step. Typically, the level of motor energization is determined as a function of a gain factor and the difference or error between the actual and command values of the specified motor operating parameter. At the time of installation, the motor controller gain factor is manually adjusted to achieve stable motor operation throughout the course of the process. If the gain factor is too high, the motor oscillates or rings about the commanded parameter value; if the gain factor is too low, the commanded parameter values are attained too slowly, if at all. The process steps are only correctly performed if the gain factor is properly adjusted.

A problem with servomotor driven process controllers of the above type is that the coulomb friction of the servomotor changes over time. When the servomotor is new, the bearings which support the motor rotor are relatively tight resulting in a fairly high level of coulomb friction. As the machine wears in, the coulomb friction decreases and then subsequently increases with wear. The level of coulomb friction also changes whenever the motor bearings are lubricated. In addition to the load torque $T_L$, the servomotor must overcome its own coulomb friction torque $T_C$ to drive the load mechanism through the commanded sequence of process movements. If the motor controller gain factor is properly adjusted when the servomotor is new, it subsequently becomes necessary to readjust the gain factor for changes in the motor coulomb friction to maintain the desired level of motor stability. For example, the gain factor must be periodically reduced as the motor wears in, and subsequently increased with motor wear. The changes in motor coulomb friction occasioned by motor lubrication must also be compensated for by manual adjustment.

SUMMARY OF THE INVENTION

This invention provides a control method for sensing changes in the level of motor coulomb friction and for automatically adjusting the controller gain factor in accordance therewith so as to adaptively maintain the level of response stability achieved at installation. If the level of motor coulomb friction increases (due to wear, for example), the gain factor is increased; if the level of motor coulomb friction decreases (due to break in or lubrication, for example), the gain factor is decreased. As a result, the motor stability over a period of time remains substantially at the level achieved by manual adjustment at the time of installation, eliminating the need for periodic manual readjustment of the gain factor.

According to this invention, the relative level of motor coulomb friction is sensed by monitoring the motor current over the course of at least one process cycle and identifying the minimum motor current value $I_{min}$ occurring therein. The identified value $I_{min}$ is compared with a reference current value $I_{ref}$ corresponding to the minimum motor current which occurs during a process cycle when the system is operated at the desired level of response stability: that is, the average minimum motor current following manual adjustment of the gain factor at the time of installation. Differences between the measured current value $I_{min}$ and the reference current value $I_{ref}$ are attributable to changes in the level of motor coulomb friction, and such difference $\Delta I_{min}$ is used to determine a gain factor correction which automatically adjusts the motor controller gain factor.

In the Drawings

FIGS. 4 and 5 are flow diagrams representative of program instructions for implementing the control method of this invention with the computer-based controller depicted in FIG. 1.

FIG. 6 is a graph depicting the gain correction factor as a function of the sensed change in the minimum motor current $\Delta I_{min}$.

Figure 1:
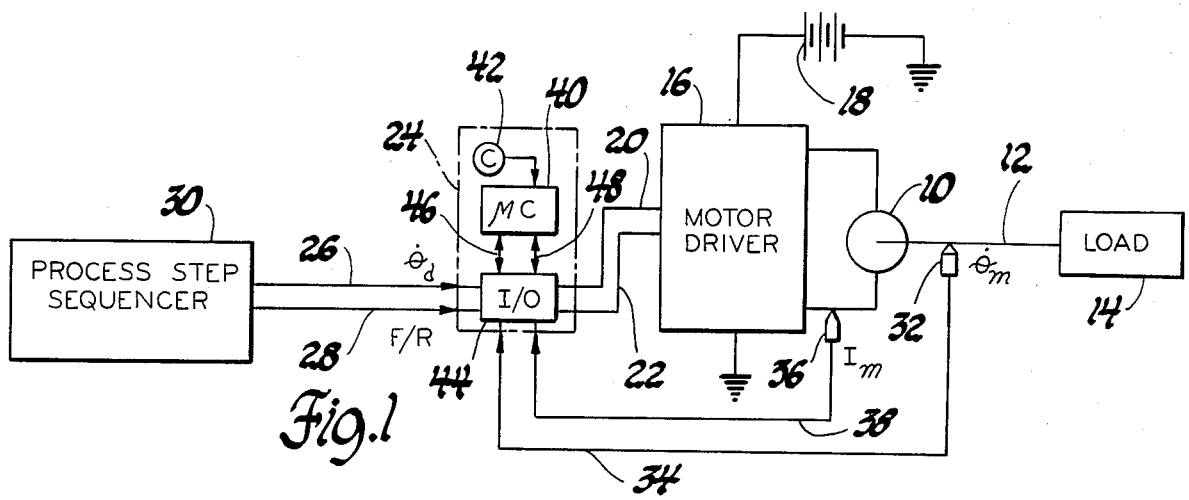
FIG. 1 is a block diagram of a servomotor driven process control system and a computer based controller for carrying out the control method of this invention.

Referring now more particularly to FIG. 1, reference numeral 10 designates an electric servomotor having an output shaft 12 connected to drive a load mechanism 14, such as a tool. A motor driver 16 is adapted to supply motor 10 with current from a source of direct current 18 in accordance with the electrical control signals on lines 20 and 22. Line 20 is used to control the operation of motor driver 16 when forward motor rotation is desired and the line 22 is used when reverse motor rotation is desired. If motor 10 is a DC electric motor, the motor driver 16 may be a transistor bridge inverter and the source 18 may be a battery as shown. The electrical control signals on lines 20 and 22 are developed by a computer-based controller 24 which in turn is responsive to command signals on lines 26 and 28 provided by process step sequencer 30. The command signal on line 26 represents the desired motor speed $\dot{\theta}_d$ and the command signal on line 28 represents the desired motor direction F/R. The actual motor speed $\dot{\theta}_m$ is sensed by a speed transducer 32 located in proximity to the motor output shaft 12 and an electrical signal in accordance therewith is provided as an input to controller 24 via line 34. The motor current $I_m$ is sensed by the transducer 36 and an electrical signal in accordance therewith is provided as an input to controller 24 via line 38.

The controller 24 includes a microcomputer (μC) 40, a high frequency clock (C) 42 for controlling the execution timing of microcomputer 40 and an input/output unit (I/O) 44 connected to microcomputer 40 via an address-and-control bus 46 and a bidirectional data bus 48. The input/output device 44 operates to receive command signals from process step sequencer 30 via lines 26 and 28 and feedback signals from transducers 32 and 36 via lines 34 and 38, and to output control signals to motor driver 16 via lines 20 and 22.

The process control system depicted in FIG. 1 is adapted to repeatedly drive the load mechanism 14 through a predetermined sequence of movements which define the steps of a process. The required motor speed $\dot{\theta}_d$ and direction F/R to perform the various process steps are stored in coded form in process step sequencer 30, and the sequencer 30 issues motor speed and direction commands on lines 26 and 28, respectively, in the sequence required for carrying out the process steps. The controller 24 receives the speed and direction commands on line 26 and 28, compares the commanded speed value $\dot{\theta}_d$ with the actual speed value $\dot{\theta}_m$ to form an error signal, and develops motor control signals on lines 20 and 22 for bringing the actual motor speed $\dot{\theta}_m$ into correspondence with the desired motor speed $\dot{\theta}_d$. As will be explained below, the motor current input $I_m$ to controller 24 is used according to this invention to alter the control signals on lines 20 and 22 so as to compensate the energization of servomotor 10 for changes in the motor coulomb friction.

Figure 2:
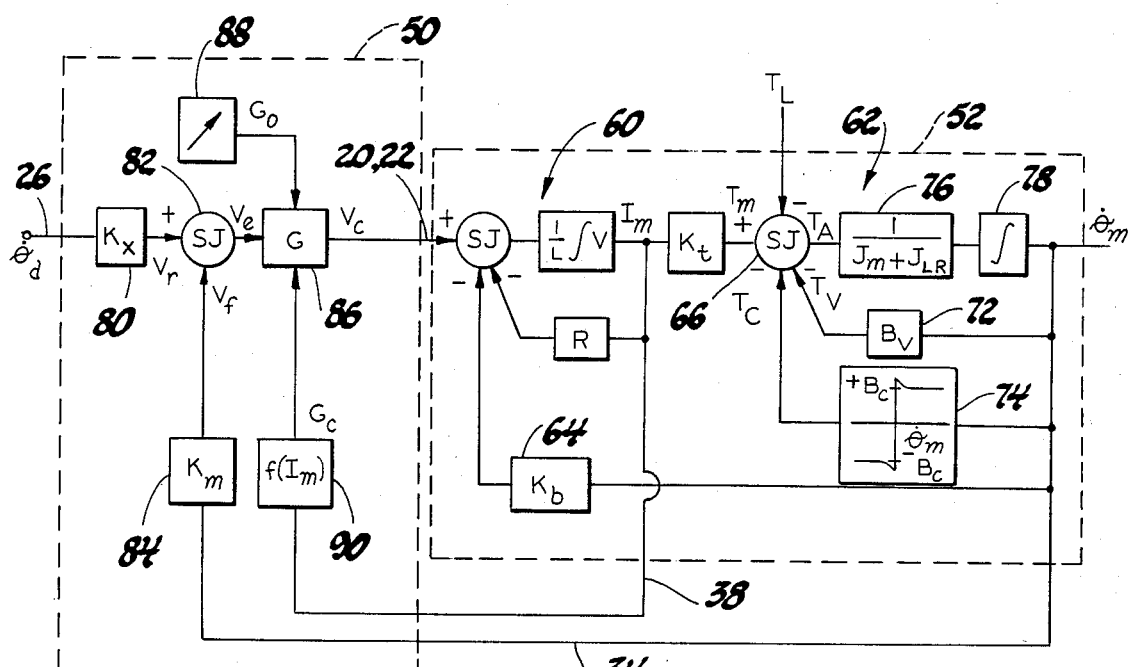
FIG. 2 is a control system diagram of the servomotor and the controller depicted in FIG. 1.

The servomotor 10, the motor driver 16 and the controller 24 depicted in FIG. 1 are schematically depicted in the control system diagram of FIG. 2. The controller 24 is included within the block designated by the reference numeral 50, and the motor 10 and motor driver 16 are included within the block designated by the reference numeral 52. Thus, the speed command on line 26, the speed feedback and the motor current signals on lines 34 and 38 are applied as inputs to block 50; the control signals on lines 20 or 22 and the load torque $T_L$ are applied as inputs to the block 52. The motor speed $\dot{\theta}_m$ is an output of the block 52.

The block 52 comprises an electrical portion, generally designated by the reference numeral 60, and a mechanical portion, generally designated by the reference numeral 62. The electrical portion 60 represents the inductive (L) and resistive (R) electrical characteristics of the motor winding and defines the relationship by which the applied voltage ($V_c$) is converted to motor current $I_m$. In addition to the electrical characteristics (L, R) of the motor winding, the motor current $I_m$ is affected by a motor speed related back-EMF term $K_b$ as indicated by the block 64. The motor current $I_m$ is converted to motor torque $T_m$ via the motor torque constant $K_t$ and applied as an additive input to summing junction 66. Subtractive inputs to summing junction 66 include the load torque $T_L$, the viscous friction torque $T_V$, and the motor coulomb friction torque $T_C$. The net or accelerating torque $T_A$ applied to the motor and load inertia is thus equal to the motor torque $T_m$ less the load torque $T_L$, the coulomb friction torque $T_C$ and the viscous friction torque $T_V$. Mathematically, the summing junction torques may be represented by the following expression:

$$T_A = T_m - T_L - T_C - T_V$$

The load torque $T_L$ represents the mechanical resistance to rotation offered by the load mechanism 14, the coulomb friction torque $T_C$ relates to the frictional resistance to rotation offered by the servomotor itself, and the viscous friction torque $T_V$ represents the aerodynamic resistance to rotation due to windage. The net or accelerating torque $T_A$ acts through the motor inertia (designated by the reference numerals 76 and 78) to produce motor rotation, $\dot{\theta}_m$.

The viscous friction torque $T_V$ is a direct function of the motor speed $\dot{\theta}_m$ by the proportionality constant $B_v$ as indicated at the block 72. The coulomb friction torque $T_C$ is substantially constant ($B_c$) and independent of the motor speed, the sign of the term being a function of the direction of motor rotation. This relationship is indicated in FIG. 2 by the graph in the block 74.

Referring now to the block 50 of the control system diagram of FIG. 2, it will be seen that the speed command $\dot{\theta}_d$ on line 26 is applied through a constant scaler $K_x$ as indicated by block 80 to form a voltage reference $V_r$ which, in turn, is supplied as an additive input to summing junction 82. The actual motor speed $\dot{\theta}_m$ is applied through a further constant scaler $K_m$ as indicated at block 84 to form a feedback voltage $V_f$ which, in turn, is applied as a subtractive input to the summing junction 82. Thus, the output of summing junction 82 is an error voltage $V_e$ which represents the error between the commanded and actual values of motor speed. The error voltage $V_e$ is applied as an input to the gain block 86. Two gain terms $G_o$ and $G_c$ are also applied as inputs to the gain block 86. The first gain term $G_o$ is manually adjustable as indicated by the block 88, and the adjustment is typically made by an operator at the time the servomotor controller is installed. The second gain term $G_c$ is a function of the motor current $I_m$ as indicated at the block 90. The gain terms $G_o$ and $G_c$ are combined with the error voltage $V_e$ in gain block 86 to form a command voltage $V_c$ which, in turn, is applied as an input via line 20 or 22 to the control system diagram block 52.

The control system diagram of FIG. 2 has relevancy in at least two respects: it illustrates the nature of the various torque components that determine the motor accelerating torque $T_A$, and it broadly sets forth the control methodology of this invention. This invention recognizes that when the servomotor 10 is used in a process control application involving repeated execution of a fixed set of process steps, changes in the coulomb friction torque $T_C$ may be identified and used in the development of an adaptive servomotor gain correction. The objective of the invention is to maintain the response stability of the servomotor at a desired level over the life of the process controller without requiring periodic manual gain adjustments. According to this invention, changes in the motor coulomb friction are identified by determining the minimum motor current value $I_{min}$ over the course of a process cycle, and by comparing that value with the minimum current value $I_{ref}$ which occurred shortly following the manual gain adjustment at installation of the process controller. The current must be measured for a nonzero motor speed since the motor coulomb friction term $B_c$ is nonlinear in the vicinity of zero speed as shown in the graph of the control system diagram block 74. An increase in the minimum motor current over the course of the process cycle indicates an increase in the motor coulomb friction torque. Similarly, a decrease in the minimum motor current over the course of a process cycle indicates a decrease in the motor coulomb friction torque. As indicated above, it is expected that as the servomotor 10 breaks in, the level of motor coulomb friction torque will decrease and thereafter increase with wear.

The mathematical expression represented by the summing junction 66 and given above, may be reorganized to show the relationship between the motor current $I_m$ and the other motor parameters:

$$I_m = (T_L + T_C + T_V + T_A)/K_t$$

where $K_t$ is the motor torque constant as indicated above in reference to FIG. 2. The term $K_t$ is by definition a constant and thus may be neglected in an analysis of the above expression. The load torque and viscous friction torque terms $T_L$ and $T_V$ will likely change dramatically over the course of a process cycle, but do not vary over time. In other words, the terms $T_L$ and $T_V$ are process dependent and, in a global sense, substantially time independent. Due to the nature of the closed loop control, the accelerating torque $T_A$ is also process dependent and substantially time independent. Although a change in the coulomb friction torque $T_C$ causes an instantaneous change in the accelerating torque $T_A$, the closed loop controller 24 operates to adjust the motor current $I_m$ in a manner to drive the accelerating torque $T_A$ back to its process dependent value. Thus, for a given point in the process, the values of the terms $T_L$, $T_V$ and $T_A$ are substantially the same from cycle to cycle. This invention identifies a given point in the process cycle by monitoring the motor current $I_m$ and identifying the minimum value $I_{min}$ thereof for nonzero motor speed. Such minimum value will recur from cycle to cycle so long as the coulomb friction torque $T_C$ remains substantially constant. If the motor coulomb friction torque increases over time, the minimum motor current $I_{min}$ will correspondingly increase; if the motor coulomb friction torque decreases over time, the minimum motor current $I_{min}$ will correspondingly decrease. To the extent that the minimum motor current deviates from a reference minimum current $I_{ref}$ established following initial manual adjustment of the controller gain, a change in the motor coulomb friction torque $T_C$ is indicated.

Figure 3:
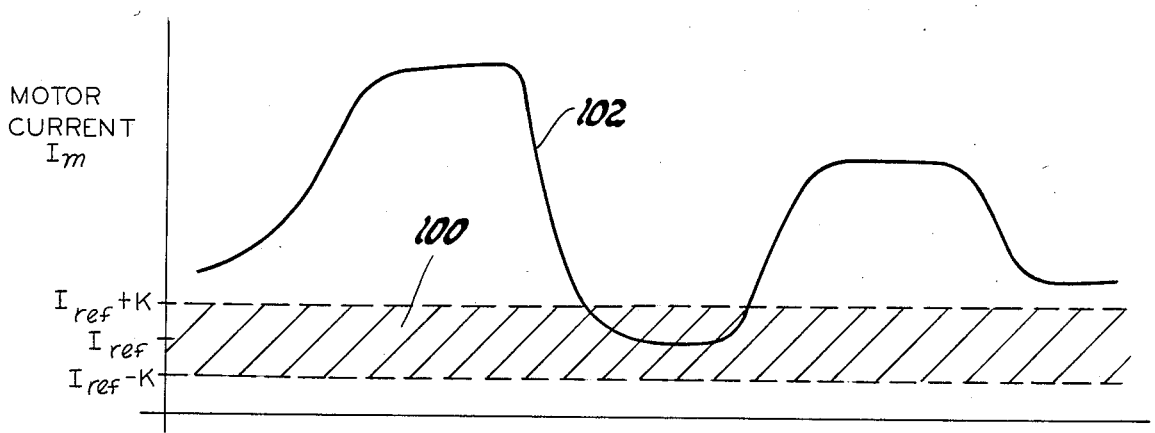
FIG. 3 is a graph of the motor current $I_{min}$ and reference current $I_{ref}$ as a function of time for a portion of a given process.

Briefly, the control philosophy defined above is mechanized according to this invention by establishing a window of minimum motor current values as shown in the graph of FIG. 3 by the reference numeral 100. The trace 102 represents the motor current $I_m$ for a step of a given process. So long as the minimum motor current value $I_{min}$ occurring during the course of a process cycle falls within the window 100, no significant change in the motor coulomb friction torque $T_C$ is indicated and no gain adjustment is made. If the value of $I_{min}$ falls outside the window 100, however, the amount of the deviation ($\Delta I_{min}$) is determined and a gain correction amount $G_c$ is recalled from a look-up table or other function generating device as graphically depicted in FIG. 6. The gain term $G_o$ is manually set at the time of installation and the overall controller gain is equal to the sum of $G_o$ and $G_c$.

Figure 4:
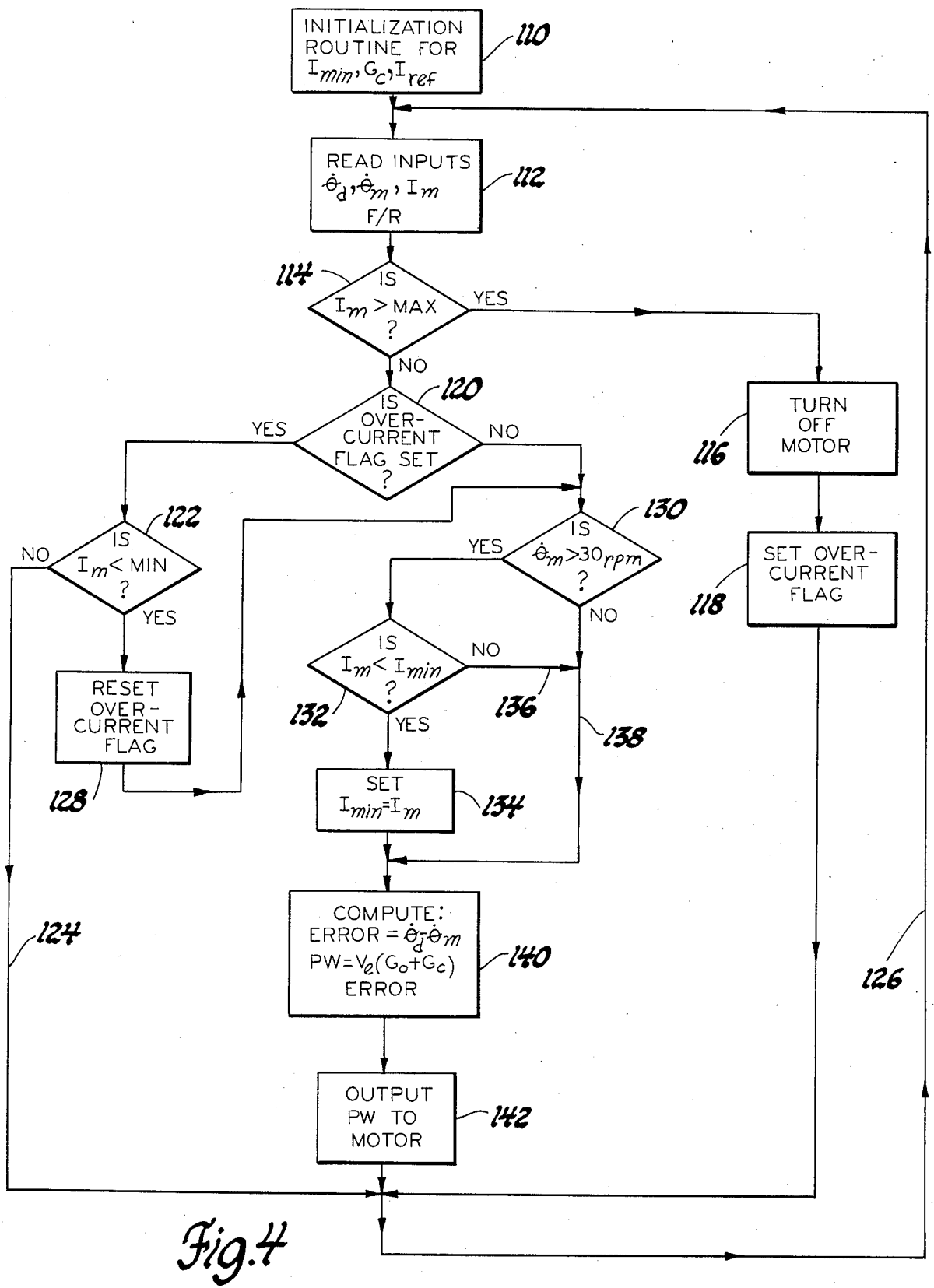

The flow diagrams depicted in FIGS. 4 and 5 are representative of suitable program instructions to be executed by the microcomputer 40 of controller 24 for implementing this invention. The main and initialization programs depicted in FIG. 4 initialize the controller at installation, read the various input signals, identify a minimum current value $I_{min}$ occurring within a process cycle, and control motor energization as a function of the error voltage $V_e$ and the gain terms $G_o$ and $G_c$. An interrupt program, depicted in FIG. 5, is periodically executed to compare the most recently identified minimum current value $I_{min}$ with the window of current values designated by reference numeral 100 in FIG. 3, and to adjust the gain correction term $G_c$ if $I_{min}$ lies outside the window 100. The interrupt program may be executed on any periodic basis which is longer than the process cycle duration.

The execution of the main program of FIG. 4 is preceded by the execution of an initialization routine designated by the reference numeral 110. The initialization routine is executed at the time the process controller is installed and its gain manually adjusted, or thereafter when and if it becomes necessary to manually readjust the gain term $G_o$. Preferably, the initialization routine includes suitable program instructions, such as those described below in reference to the main program, for energizing the servomotor 10 in accordance with the speed and direction commands of process step sequencer 30. In such mode, the controller gain is determined strictly as a function of the manually adjustable gain term $G_o$. In addition, the initialization routine monitors the motor current in a similar manner to that described below in reference to the main program to determine the minimum motor current occurring in a process cycle. Such minimum motor current becomes the reference motor current $I_{ref}$ with which later measured minimum motor current values, $I_{min}$ are compared. As a part of the initialization routine, the term $I_{min}$ is reset to a value substantially greater than $I_{ref}$, and the term $G_c$ is set equal to zero. Thus, at the termination of the initialization routine, the gain term $G_o$ has been manually adjusted to provide the desired level of response stability and the term $I_{ref}$ is set at a value equal to the minimum motor current occurring during a process cycle. At such point, execution of the main program is commenced.

As indicated above, the function of the main program depicted in FIG. 4 is to drive the servomotor 10 in accordance with the speed and direction commands of process step sequencer 30 and to determine the minimum motor current value $I_{min}$ occurring during a process cycle. As indicated at instruction block 112, the microcomputer 40 begins the main program by reading the various input values from the I/O unit 44. These include the desired motor speed $\dot{\theta}_d$, the desired motor direction F/R, the actual motor speed $\dot{\theta}_m$, and the actual motor current $I_m$. After reading the input values, microcomputer 40 determines if an overcurrent condition exists in servomotor 10. Thus, instruction block 114 is executed to compare the motor current value $I_m$ to an overcurrent value MAX. If the motor current $I_m$ is greater than MAX, instruction blocks 116 and 118 are executed to turn-off servomotor 10 and to set an overcurrent flag in microcomputer 40. If the motor current $I_m$ is less than or equal to MAX, the decision block 120 is executed to determine if the overcurrent flag is set. If so, the motor 110 has been turned off due to an overcurrent, and decision block 122 is executed to determine if the motor current value $I_{min}$ has fallen below a safe current value MIN. If not, the microcomputer 40 is returned to the instruction block 112 as indicated by the flow diagram lines 124 and 126; if so, the instruction block 128 is executed to reset the overcurrent flag, indicating that the overcurrent condition has passed. If it is determined at instruction block 120 that the overcurrent flag is not set, the execution of decision block 122 and instruction block 128 is skipped. Then, decision block 130 is executed to determine if the actual motor speed $\dot{\theta}_m$ is greater than 30 rpm. As indicated earlier, the minimum motor current value $I_{min}$ must be established according to this invention for a nonzero motor speed due to the nonlinearity of the motor coulomb friction term $B_c$ in the vicinity of zero motor speed. In the illustrated embodiment, the motor current is only monitored for the purpose of identifying the minimum motor current value when the motor speed is in excess of 30 rpm. Thus, when the decision block 130 is answered in the affirmative, the decision block 132 is executed to determine if the motor current value $I_m$ is less than the present value of $I_{min}$. Initially, as explained above, the term $I_{min}$ is set to a relatively high value by the initialization routine. If $I_m$ is less than $I_{min}$ a new minimum motor current value has been reached and the instruction block 134 is executed to set the term $I_{min}$ equal to the motor current value $I_m$. If the value of $I_m$ is greater than or equal to $I_{min}$, the execution of instruction block 134 is skipped as indicated by flow diagram lines 136 and 138. If the decision block 130 is answered in the negative, indicating relatively low motor speed, the execution of decision block 132 and instruction block 134 is skipped as indicated by flow diagram line 138. Then, instruction block 140 is executed to compute the speed error $(\dot{\theta}_d - \dot{\theta}_m)$ and to compute the servomotor energization pulse-width as a function of the speed error and a combined gain term $(G_o + G_c)$. As explained above, the term $G_c$ is set equal to zero at installation by the initialization routine. Then, instruction block 142 is executed to output the pulse-width or control information to motor driver 16 and motor 10 via line 20 or 22. If the direction F/R input on line 28 indicates forward motor rotation is desired, the pulse-width information is supplied to motor driver 16 via line 20; if reverse motor rotation is desired, the pulse-width information is supplied to motor driver 16 on line 22. After outputting the motor command, the microcomputer 40 is returned to the instruction block 112 to read new values of the input parameters as indicated by flow diagram line 126.

The interrupt program in FIG. 5 is executed periodically in response to an externally generated interrupt signal having a period which is at least as long as a process cycle. As indicated earlier, the function of the interrupt program is to determine if the minimum current value $I_{min}$ identified by the main program of FIG. 4 has varied sufficiently to indicate a change in the motor coulomb friction, and to effect an adaptive gain correction of the term $G_c$, if necessary. The decision blocks 150 and 152 determine if the minimum motor current value $I_{min}$ identified by the main program of FIG. 4 falls within the window 100 as defined in the graph of FIG. 3. The decision block 150 determines whether $I_{min}$ is greater than the quantity $(I_{ref} + K)$. If not, the decision block 152 determines if $I_{min}$ is less than the quantity $(I_{ref} - K)$. If either condition is met, the minimum motor current value lies outside the window 100 and the instruction blocks designated generally by the reference numeral 154 are executed to adaptively adjust the value of the gain term $G_c$. If neither of the conditions identified by decision blocks 150 and 152 are met, the minimum motor current value lies within the window 100 and the execution of the instruction blocks designated by reference numeral 154 are skipped, as indicated, by flow diagram line 156. If the value of $I_{min}$ falls above the window 100, the instruction block 158 is executed to compute a minimum current deviation term $\Delta I_{min}$ according to the expression:

$$\Delta I_{min} = I_{min} - (I_{ref} + K)$$

If the minimum motor current value $I_{min}$ falls below the window 100, instruction block 160 is executed to compute the minimum current deviation term $\Delta I_{min}$ according to the expression:

$$\Delta I_{min} = I_{min} - (I_{ref} - K)$$

Then, instruction block 162 is executed to determine the correct value of the gain term $G_c$ as a function of the computed $\Delta I_{min}$. In the illustrated embodiment, the relation between $G_c$ and $\Delta I_{min}$ is empirically determined and stored in a look-up table in microcomputer 40 as indicated by the graph in FIG. 6. A positive value of $\Delta I_{min}$ indicates a minimum current value which exceeds the window 100 which in turn indicates an increase in the amount of motor coulomb friction. In such case, the $G_c$ values are positive in sign to increase the overall controller gain for maintaining the level of response stability established at initialization. A negative value of $\Delta I_{min}$ indicates a minimum current value below the window 100, which in turn indicates a reduced level of motor coulomb friction. In such case, the $G_c$ values are negative in sign to decrease the overall controller gain so as to maintain the level of response stability established at initialization of the process controller.

The decision blocks 164 and 166 determine if the overall gain $(G_o + G_c)$ is greater than a maximum value G MAX or less than a minimum value G MIN, respectively. If either condition is true, a failure or unintended operation has occurred and the instruction block 168 is executed to stop the servomotor 10 and to sound an alarm. If neither condition defined by the decision blocks 164 and 166 is met, the execution of instruction block 168 is skipped and the microcomputer 40 is returned to the main program depicted in FIG. 4.

In view of the above, it is seen that the control method of this invention adaptively compensates the gain of a servomotor driven process control system for changes in the motor coulomb friction torque. As a result, manual adjustment of the gain need only be made once, at installation of the system, or subsequently thereafter when the process is changed.

Although this invention has been described in reference to the illustrated embodiment, it will be understood that various modifications thereto will occur to those skilled in the art and that systems incorporating such modifications may fall within the scope of this invention, which is defined by the appended claims.

The embodiments of the invention in which an exclusive property or privilege is claimed are defined as follows:

1. For a process control system including a source of electricity, a servomotor adapted to drive a load mechanism, and a servomotor controller for energizing the servomotor with current from the source to generate motor torque which overcomes the load mechanism torque and the motor coulomb friction torque to drive the load mechanism through a predetermined and cyclic sequence of movements for carrying out the steps of a process, the level of motor energization being determined as a function of the difference between actual and desired values of a motor operating parameter and a gain factor chosen to result in a desired level of response stability, a method of operation comprising the steps of:

monitoring the motor current over at least one cycle of said process and identifying the minimum motor current value occurring therein;

comparing the identified current value with a reference value corresponding to the average minimum motor current which occurs when the controller is operated at the desired level of response stability and developing a deviation signal as a function of the difference therebetween to obtain an indication of variation in the motor coulomb friction torque; and adjusting the controller gain factor by a correction amount determined in relation to said deviation signal such that the gain factor is increased with increasing coulomb friction torque and decreased with decreasing coulomb friction torque, thereby to maintain the desired level of response stability despite variation in the motor coulomb friction torque.

2. For a process control system including a source of electricity, a servomotor adapted to drive a load mechanism, and a servomotor controller for energizing the servomotor with current from the source to generate motor torque which overcomes the load mechanism torque and the motor coulomb friction torque to drive the load mechanism through a predetermined and cyclic sequence of movements for carrying out the steps of a process, a method of operation comprising the steps of:

controlling the level of motor energization as a function of the difference between actual and desired values of a motor operating parameter and an overall gain factor comprising a base gain component and an adaptive gain component, the base gain component being manually adjustable at the initiation of system operation to result in an overall gain factor which yields a desired level of response stability;

identifying the average minimum value of motor current occurring at the initiation of system operation following the manual adjustment of said base gain component, and forming a reference current signal in accordance therewith; and thereafter monitoring the motor current over at least one cycle of said process while the motor speed is in excess of a reference amount and identifying the minimum motor current value occurring therein;

comparing the identified minimum motor current value with a reference current signal and developing a deviation signal as a function of the difference therebetween such deviation signal being indicative of variation in the motor coulomb friction torque; and periodically updating the value of said adaptive gain component as a function of the deviation signal such that the overall gain factor is increased with increasing motor coulomb friction torque and decreased with decreasing motor coulomb friction torque, thereby to maintain the desired level of response stability despite variation in the motor coulomb friction torque.

3. A method of operation as set forth in claim 2, including the steps of:

comparing the overall gain factor to upper and lower reference gain values corresponding to maximum and minimum values of overall gain consistent with proper operation of the process control system;

interrupting energization of the motor if the overall gain factor exceeds the upper reference gain value; and interrupting energization of the motor if the overall gain factor falls below the lower reference gain value.

4. For a process control system including a source of electricity, a servomotor adapted to drive a load mechanism, and a servomotor controller for energizing the servomotor with current from the source to generate motor torque which overcomes the load mechanism torque and the motor coulomb friction torque to drive the load mechanism through a predetermined and cyclic sequence of movements for carrying out the steps of a process, a method of operation comprising the steps of:

controlling the level of motor energization as a function of the difference between actual and desired values of a motor operating parameter and an overall gain factor comprising a base gain component and an adaptive gain component, the base gain component being manually adjustable at the initiation of system operation to result in an overall gain factor which yields a desired level of response stability;

identifying the average minimum value of motor current occurring at the initiation of system operation following the manual adjustment of said base gain component and defining a window of motor current values about such average minimum motor current value; and thereafter monitoring the motor current over at least one cycle of said process while the motor speed is in excess of a reference amount and identifying the minimum motor current value occurring therein;

developing a deviation signal in relation to the amount by which the identified minimum motor current value falls outside said window of motor current values, said deviation signal being indicative of significant variation in the motor coulomb friction torque; and updating the adaptive gain component as a function of the deviation signal so that the overall gain factor increases with increasing motor coulomb friction torque and decreases with decreasing motor coulomb friction torque to maintain the desired level of response stability despite variation in the motor coulomb friction torque.

* * * * *